United States Patent [19]

Feinbloom

[11] Patent Number: 5,129,717
[45] Date of Patent: Jul. 14, 1992

[54] ADJUSTABLE TELESCOPIC ALIGNMENT APPARATUS FOR USE WITH A CARRIER LENS

[75] Inventor: Richard E. Feinbloom, New York, N.Y.

[73] Assignee: Designs for Vision, Inc., Ronkonkoma, N.Y.

[21] Appl. No.: 649,234

[22] Filed: Jan. 29, 1991

Related U.S. Application Data

[63] Continuation of Ser. No. 469,776, Jan. 16, 1990, abandoned.

[51] Int. Cl.⁵ ................................................ G02C 1/00
[52] U.S. Cl. ..................................... 351/158; 359/481
[58] Field of Search .................... 351/158, 57, 204; 350/130, 143, 146

[56] References Cited

U.S. PATENT DOCUMENTS 3,273,456  9/1966  Feinbloom ................ 351/158
3,522,983  8/1970  Daniels ...................... 350/146

Primary Examiner—Paul M. Dzierzynski
Attorney, Agent, or Firm—Arthur L. Plevy

[57] ABSTRACT

An adjustable telescope alignment apparatus employs a telescopic assembly which is secured about the periphery to a pivot ring. The telescopic assembly extends from the front and back surfaces of the pivot ring. The pivot ring is positioned within a inner peripheral channel of a collet member to form a ball and socket joint. The collet member has an outer threaded area which is engaged by a threaded locking ring which locking ring selectively compresses the collet member. By means of the ball and socket joint one can adjust and move the telescope assembly within a desired cone of rotation. The collet member is inserted within an aperture formed in a carrier lens held by a spectacle frame and is secured to the lens by means of a suitable adhesive as applied to an outer peripheral flange of the collet member.

8 Claims, 3 Drawing Sheets

ADJUSTABLE TELESCOPIC ALIGNMENT APPARATUS FOR USE WITH A CARRIER LENS

This is a continuation of application Ser. No. 07/469,776, filed Jan. 16, 1990, now abandoned.

BACKGROUND OF THE INVENTION

This invention relates to visual aids for the visual handicapped and, more particularly, to an adjustable telescope alignment apparatus to enable handicapped users to optimumly adjust the telescopic aid according to their preferences.

There are many people throughout the world who suffer from various visual handicaps. Many such people have extremely limited fields of view and have extremely poor eyesight. These defects are due to many different diseases or different types of eye degeneration. For example, many people in the United States suffer from macular degeneration. Age-related macular degeneration is a leading cause of visual loss in the United States in adults who are sixty years of age and older. It is estimated that over 150,000 people develop this disease each year. Macular degeneration is manifested and defined by two different types of conditions. The first is known as atropic or "dry" type which results in a gradual atrophy of the sensory retina and the pigment epithelium. The second type is referred to as the exudative or "wet" form In this type, new vessels proliferate from the choriocapillaris under the sensory retina which produce hemorrhaging and scarring. This type of macular degeneration may be treated by laser photocoagulation provided that the neovascular tissue is outside the foveal avascular zone. Thus, patients who have lost vision due to macular degeneration can be helped by optical aids such as telescopic assemblies that magnify an object to be viewed. Various other persons with visual defects also require telescopic assemblies. These people, for example, are those who suffer from glaucoma, detached retinas and other similar visual defects. In order to accommodate such defects, many patients are required to wear telescopic aids as noted above. These telescopic aids, for example, are Galilean telescopes which are designed for distance tasks. Certain tasks have to be performed when the patient is stationary and others when the patient is mobile. Such telescopes are conventionally carried in plastic or glass carrier lenses. The patient's visual prescription can be incorporated into the carrier lens or not. In any event, such telescopic units can be supplied with many different types of housings to accommodate many different individuals and defects. The telescopes are mounted in a chosen location of the carrier lens which may, for example, be the vertical center. The telescopes are positioned according to the patient's interpupillary distance (p.d.). Any position within the physical limits of the carrier lens can be specially requested. The telescopes are normally mounted in a straight ahead position and require extensive fittings as well as extensive adjustments by the practitioner. Other telescope devices are referred to as bioptic telescopes and these are mounted high in the carrier lens so that the telescope would be out of the way when the patient is moving about or doing general work. In this particular instance, the carrier lens of the patient contains the patient's normal distance prescription. The telescopes are mounted high in the lens so that they can be utilized only when the patient desires to use them. The patient's distance prescription can be incorporated into either the telescope, the carrier lens or both. It is usually recommended that the prescription be accommodated in both. As indicated, the bioptic telescopes are generally mounted in the carrier lens such that the optic center of the ocular lens is below the top of the carrier lens. They are laterally de-centered to the patient's p.d. and have a standard drilling angle of inclination of ten degrees upward from the horizontal plane. Any position or angle can be specially ordered. There are also telescopes designated as spiral expanded field prism telescopes which allow the patient full flexibility and which are capable of being adjusted. These telescopes can be mounted in a plurality of different ways and are also accommodated by the carrier lens. As one can understand, the mounting of telescopes within a carrier lens is an extremely difficult procedure. There are, for example, telescopes which are universally adjustable and can be therefore operated or oriented in all three planes. Such telescopes are mounted in a carrier lens as accommodated by a spectacle frame. See, for example, U.S. Pat. No. 4,863,468 entitled UNIVERSALLY ADJUSTABLE TELESCOPIC SPECTACLE ASSEMBLY FOR USE WITH IMPLANTED INTRAOCULAR LENSES AND ASSOCIATED METHODS issued on Sep. 5, 1989 to Richard E. Feinbloom, et al, and assigned to Designs for Vision, Inc., the assignee herein. That patent describes a universally adjustable telescopic spectacle assembly for use with an implanted intraocular lens. The assembly employs an objective lens which has positioned in front of it a cylindrical lens to provide cylindrical correction to the handicapped user. The telescope assembly employs universal motion in that the assembly can be moved with respect to the spectacle frame so that one is able to shift the objective lens axis about a central point while further having the capability of moving the objective lens in a spiral motion away from or towards the eye of the user. The assembly has a pivotal joint mechanism to permit maximum oblique adjustment of the entire telescopic assembly as related to the optical or central axis of the objective lens. In this manner, a change in the condition of vision or misalignment of the intraocular lens as inserted during surgery can be compensated for by the universal adjustable telescopic lens assembly. Apart from the device described in the above-noted patent, telescopes are generally fitted by a practitioner working closely with the patient. After a satisfactory fitting, the practitioner then prescribes to the laboratory where the telescope assembly is to be positioned with respect to the carrier lenses or with respect to the spectacle frame. The laboratory provides a frame according to the prescription of the practitioner as selected by the patient. The laboratory drills the holes in the carrier lenses at the proper position and angle to tilt the telescope in the proper direction as prescribed by the practitioner. In any event, when the spectacles are returned to the practitioner and tried on the patient, there is a great deal of difficulty in attempting to accommodate the spectacle arrangement with the patient's preferences. Since the telescopes are firmly secured to the frame, they cannot be conventionally adjusted and hence one has to adjust the spectacle frame to accommodate a proper orientation of the spectacles. The frame has to be adjusted including all aspects such as the nose pads, the temples, to satisfy the proper panascopic and retroscopic tilt. The above-noted patent permits universal adjustment of a telescope assembly and such a device has extreme advantages as explained in that patent.

It is an object of the present invention to provide an adjustable alignment apparatus for a telescope which is simple to fabricate and which enables a patient as well as a practitioner to adjust the telescope assembly with minimum difficulty and with great ease.

It is a further feature of the present invention to provide an adjustable telescope assembly whereby a user or a practitioner can adjust the telescope within a desired cone of rotation and then lock the assembly in an optimumly adjusted position.

SUMMARY OF THE INVENTION

Apparatus for providing adjustability to an optical telescope of a cylindrical body configuration mounted on a carrier lens via an aperture in said lens, comprising: a collet member located in said aperture and secured to said carrier lens, said collet member being a tubular member having an opened top and bottom and having a concave groove located above an inner surface closest to said opened top, a privot ring having a central aperture for encircling the body of said telescope and having an outer convex surface for positioning said ring and telescope within said concave groove of said collet member to form a ball and socket joint to enable said telescope to be adjusted with respect to said carrier lens about a given cone of rotation and means coupled to said collet member for locking said ball and socket joint when said telescope is adjusted to a desired position.

DETAILED DESCRIPTION OF THE FIGURES

Figure 1:
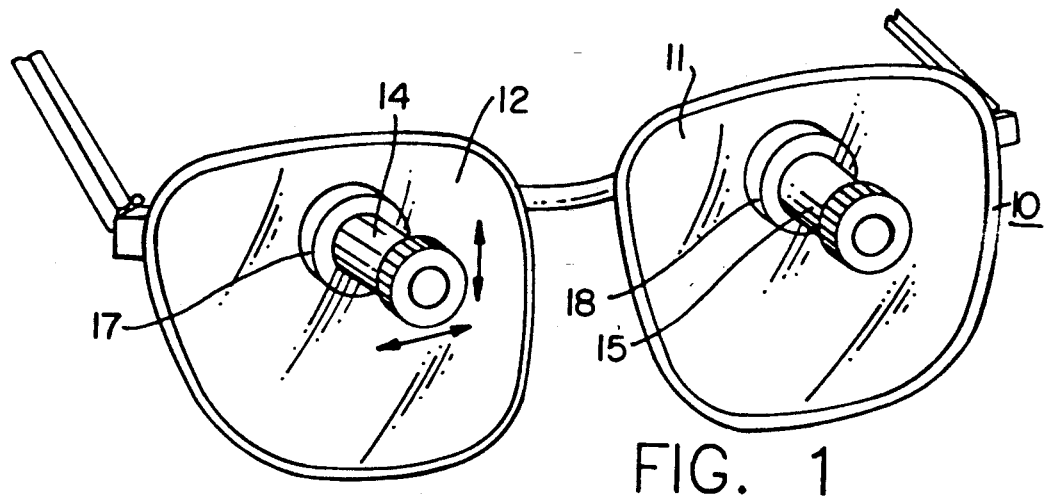
FIG. 1 is a perspective plan view of an adjustable telescope assembly associated with a spectacle frame.

Referring to FIG. 1, there is shown a spectacle frame 10. The spectacle frame 10 has two carrier lenses 11 and 12 indicative of a lens for the right eye and one for the left eye. Each carrier lens 11 and 12 may be a prescription type lens which accommodates the far distance or near distance prescription of the patient who wears the spectacle frame. Located in each carrier lens and positioned within apertures drilled through the lenses are telescope assemblies 14 and 15. As one can see, the telescope assemblies 14 and 15 are mounted via the apertures in the carrier lens and may, for example, be one of many different types of available telescope assemblies. For example, they may be full diameter telescopes, bioptic telescopes, spiral expanded field prism telescopes, spiral Galilean telescopes or micro-spiral Galilean telescopes. Such telescope systems as placed within carrier lenses and which are carried by spectacle frames are available from Designs for Vision, Inc. This company which is the assignee herein is located at 760 Koehler Avenue in Ronkonkoma, N.Y. and furnishes and supplies such telescopes assemblies as indicated in its catalog entitled "Optical Aids for the Partially Sighted". As indicated, it is extremely desirable to have such telescope assemblies adjustable and then lockable in any given position by both the user and the practitioner. As indicated above, there is a severe problem in attempting to accurately locate the telescope assemblies in the laboratory. Such telescope assemblies are cemented or otherwise securely fastened in place at the laboratory within the apertures of the carrier lenses. Many times they are not properly aligned with respect to the spectacle frame 10 and hence many problems are created. The assemblies as indicated in FIG. 1 are each associated with a collet member as 17 and 18. The collet member with an associated pivot ring as will be explained enables the telescope assembly to rotate and hence to be adjusted. When the assembly is rotated or moved in the direction of the arrows shown in FIG. 1 and is in proper orientation, it can be locked in any desired position. In this manner one can orient the telescope assembly 14 in a different orientation than telescope assembly 15 depending upon the position of the eyes of the user and so on. Once an optimum position is set for each telescope assembly, the collet and pivot, as will be explained, can be locked by means of an adjustment or locking ring and hence firmly held in place with respect to the carrier lens assemblies 11 and 12 and with respect to the frame 10.

Figure 2:
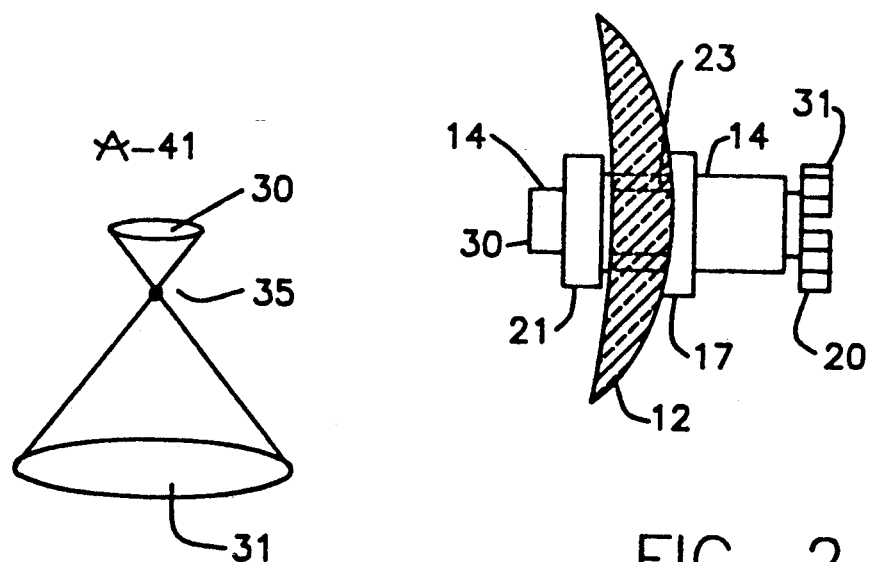
FIG. 2 is a side view of an adjustable telescope assembly apparatus according to this invention.

Referring to FIG. 2, there is shown a side view of the telescopic assembly 14 mounted in carrier lens 12. Essentially, as seen, the telescopic assembly 14 is of the type sold by DVI under the name SPIRAL GALILEAN TELESCOPES. The telescope is adjustable by means of adjusting the objective portion of the scope 20 with respect to the ocular portion 14. As seen, the entire telescopic assembly is mounted within aperture 23 which is drilled through the carrier lens 12. The telescope is firmly secured to a pivot ring, which pivot ring acts in conjunction with the collet assembly 17 as a ball and socket member. This enables one to move the entire telescopic assembly 14 within a cone of rotation. In this manner, one can move the eye piece section of the telescope as at location 30 with respect to the far end 31 of the telescope to thereby adjust the telescope within a given cone of rotation. This permits the visually handicapped person to move and adjust each telescope in any desired position and then to lock the telescope by means of a locking ring 21 which is associated with the collet member 17.

Collet member 17 is a longitudinal tubular member having an opened top and an opened bottom. The opened top is surrounded by a peripheral flange 37 where the bottom of the flange is secured to the carrier lens 12. The longitudinal tubular collet member 17 has a tapered bottom portion which has an outer threaded section located thereon. The outer threaded section 38 enables the locking ring 21 to be secured to the collet member. The collet member 17 has an inner concave groove 36. The inner concave groove 36 acts as a socket to accommodate the curved or convex outer surface of the pivot ring 22, thus forming the ball and socket assembly. Since the collet member 17 has slots directed from the open bottom towards the top, these slots can be compressed by action of the locking ring 21 which in conjunction with the tapered inner surface thereof, serves to alternately compress and expand the slots associated with the collet member 17 to thereby lock or restrain the action afforded by the ball and socket joint.

Figure 3:
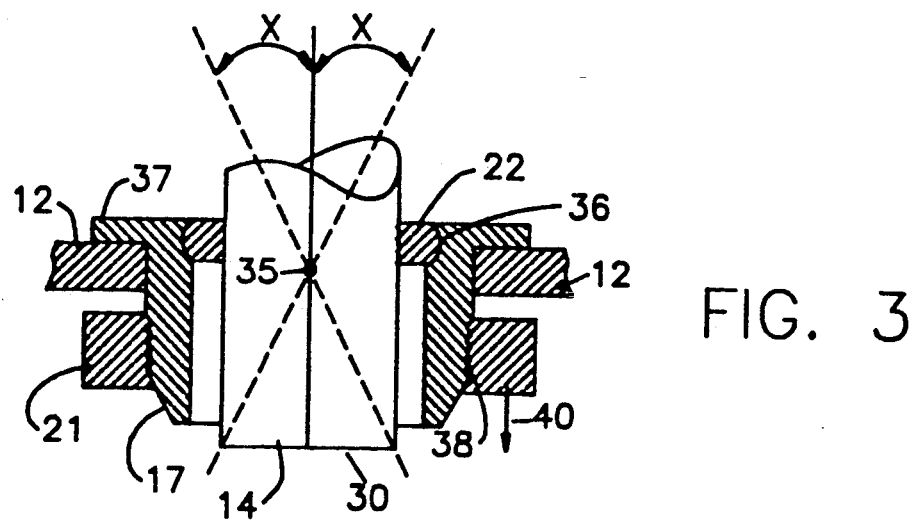
FIG. 3 is a partial cross-sectional view of the adjustable telescope assembly.
Figure 4:
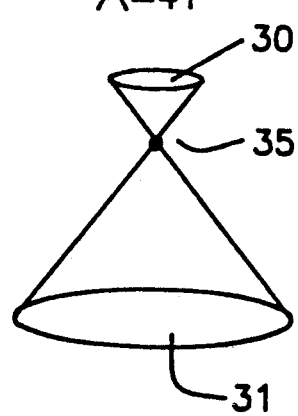
FIG. 4 is a diagramatic view useful in explaining the operation of the telescope apparatus.

Referring to FIG. 3, there is shown a cross-sectional view of the entire mechanism depicted in FIG. 2. Essentially, the telescope 14 is firmly secured to a pivot ring 22. The pivot ring 22 is an annular member having a curved or convex outer peripheral surface. The pivot ring is pressed fit into the collet member 17 via an accommodating peripheral inner concave recess 36. As seen, the collet member 17 has the accommodating concave recess 36 of a contour to accommodate the outer curved convex surface of the pivot ring 22. The collet member 17 has an outer peripheral flange 37 which outer flange is glued to or otherwise secured to the surface of the carrier lens 12. The collet member 17 has a bottom tapered end which includes a top threaded portion 38 which forms a peripheral thread about the bottom end of the collet member 17. The term "collet member" is employed to indicate that the member 17 actually has slots on the surface thereof, namely four slots, and therefore can be compressed or expanded by rotation of the adjustment or locking ring 21. The ring 21 rides upon the threads of the collet member 17. As seen in FIG. 3, the collet member 17 has a bottom tapered portion whereas the adjustment ring 21 has a corresponding bottom tapered portion and is threaded at the area 38 to conform with the thread pattern located on the peripheral surface of the collet. In this manner, when the adjustment ring 21 is moved in the direction of arrow 40, the collet is allowed to return to its normal uncompressed position, thereby enabling one to move the telescope assembly 14 by means of the pivot ring 22 and the collet 17. As indicated, the pivot ring in conjunction with the collet member 17 enables one to now rotate the entire telescope with respect to the carrier lens 12 or the spectacle frame 10. This operation occurs at a pivot point which is designated in FIG. 3 by numeral 35. The pivot point is located in the center of the pivot ring 22. In this manner, the ocular input 30 of the telescope as well as the far end 31 move to form a cone of rotation as shown in FIG. 4 with respect to the pivot point 35. In this manner, the entire end of the telescope can move with respect to the eye 41 of the user. Thus the user can adjust the telescope end 31 with respect to his eye 41 and assure that the input 30 follows a similar matching pattern. It is, of course, seen and understood that the angle depicted in FIG. 3 can vary from scope to scope but the angle of adjustment for a typical telescope assembly is thirty degrees. It is further seen in FIG. 3 that the body of the telescope 14 cannot move beyond the constraints formed by the inner wall of the collet member 17. Hence, this provides for the maximum adjustment angle. When the telescope assembly 14 is properly set with respect to the user's eye, one then moves the adjustment ring 21 in the direction opposite to arrow 40. This compresses the collet and therefore securely locks the pivot ring 22 and the collet member 17. As one can see, the collet member 17 preferably is fabricated from a flexible material and hence the operation of the adjustment ring 21 serves to firmly grasp and firmly lock the telescope assembly 14 in an optimum position as set by the practitioner or by the patient. This operation can be accommodated for either eye of the patient and hence he can have a separate optimum adjustment of the telescope assemblies for the left and right eyes and totally independent of one another. The practitioner who is fitting the patient with telescope assemblies need not be unduly concerned with the orientation of the telescope with respect to the carrier lens. The only measurement that he has to be concerned with is the interpupillary distance or the distance between the center of the eyes of the visually handicapped person. Once the center between the person's eyes is accurately measured by the practitioner, then the apertures for the telescope assemblies can be drilled in any reasonable manner. Due to the adjustability of the telescope assemblies, the optimum position can now be accommodated when the spectacles are returned to the practitioner and under control of the user of the device. When the proper setting is implemented, the telescope is locked in place by means of the locking ring 21.

Figure 5:
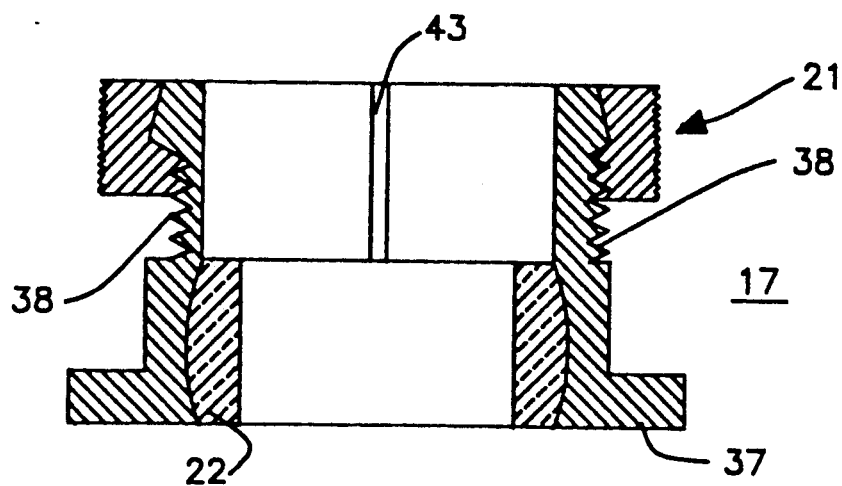
FIG. 5 is a cross-sectional view of the assembly.
Figure 6:
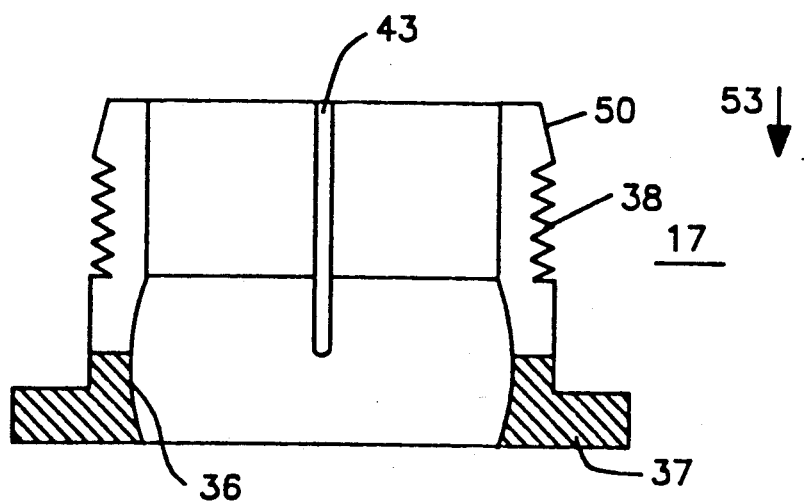
FIG. 6 is a cross-sectional view of a collet member utilized with this device.
Figure 7:
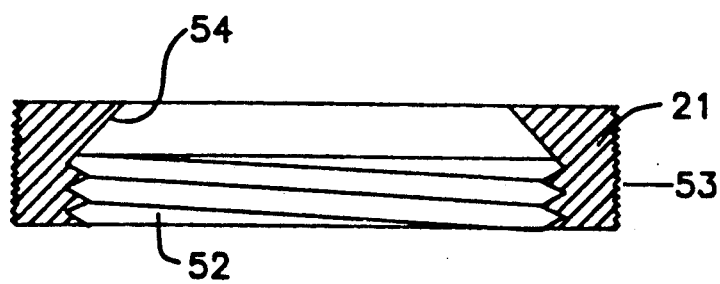
FIG. 7 is a cross-sectional view of an adjustment or locking ring employed with the telescope alignment apparatus according to this invention.

Referring to FIG. 5, there is shown a cross-sectional view of the entire assembly as, for example, utilized in conjunction with FIG. 3. As one can see, the adjustment ring 21 is in position and riding on the threads 38 of the collet member 17. The pivot ring 22 is shown located within the inner peripheral channel 17 of the collet 17 which thus forms the ball and socket joint with the pivot ring 22. There is shown an elongated slot 43 which in conjunction with three other slots allows the collet 17 to be compressed by means of the adjustment or locking ring 21. The parts shown in FIG. 5 are all fabricated from a cast acrylic material but can be made from many different types of material. The typical size of the assembly show is such that the collet member 17 has an effective outer diameter of approximately ⅜", and being approximately 3/10" in height which is the typical height of the entire assembly. As one can ascertain from FIG. 6, the collet member is essentially a relatively complicated device. The collet member has four slots 43 located on the surface of the member and positioned ninety degrees apart. The slots enable the adjustment or locking ring 21 to compress the collet member and to thus secure the telescope in a fixed relationship with respect to the frame. The collet member has an inner peripheral rounded channel 36 to accommodate the outer curved surface of the pivot ring 22. As indicated, the pivot ring 22 and collet channel 36 form a ball and socket joint. The collet member 17 has a threaded portion 38 as shown in FIG. 6. It is understood that the size or pitch of the threads is not important. The collet member 17 also has a tapered portion 50 which conforms to the shape of the adjustment or locking ring 21. The locking ring 21 is shown in greater detail in the cross-sectional view of FIG. 7. The locking ring has an inner threaded portion 52 and has an outer knurled surface 53. The locking ring which also has an inner tapered surface 54 which is a peripheral taper which co-acts with the outer peripheral tapered surface 50 of the collet member. In this manner, as the ring 21 is moved in the direction of arrow 53 of FIG. 6, the surfaces 54 and 50 abut one against the other which therefore causes the channels 43 to tend to close, thereby increasing the coupling force between the pivot ring and the collet. It is understood that the flange 37 of the collet is secured by means of a glue adhesive or other means to the surface of the carrier lens as, for example, lens 12 as shown in FIG. 1.

Figure 8:
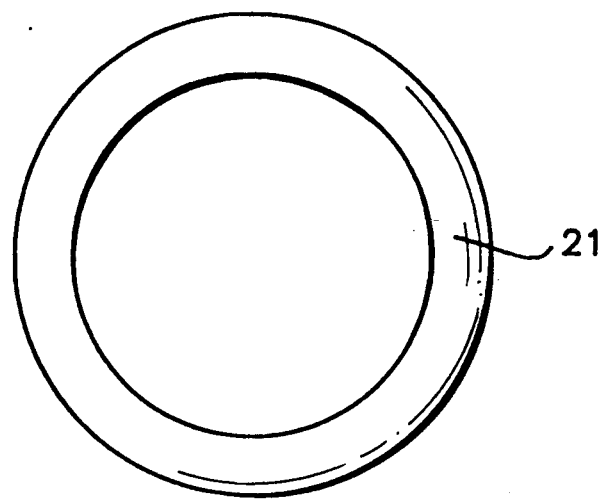
FIG. 8 is a front plan view of a locking ring according to this invention.
Figure 9:
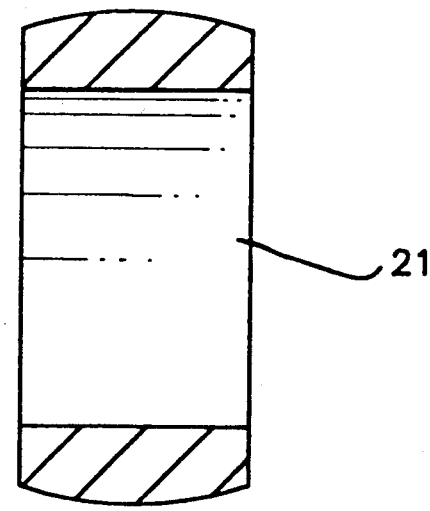
FIG. 9 is a cross-sectional view of the locking ring shown in FIG. 8.

Referring to FIG. 8, there is shown a front view of the adjustment or locking ring 21 while FIG. 9 shows a cross-sectional side view of the ring 21 depicting the curved outer surface 60 which essentially co-acts with the curved inner surface 36 of the collet member 17 to form a ball and socket joint.

I claim:

1. Apparatus for providing adjustability to an optical telescope of a cylindrical body configuration mounted on a carrier lens via an aperture in said lens, comprising: a collet member located in said aperture and secured to said carrier lens, said collet member being a tubular member having an opened top and bottom with grooved slots directed from said bottom towards said top enabling said collet member to compress and expand upon applications of a force thereto, said collet member having an outher threaded surface portion nearer said open end and having a concave grove located about an inner surface closest to said opened top, a pivot ring having a central aperture for encircling the body of said telescope and having an outer convex surface for positioning said ring and telescope within said concave groove of said collet member to form a ball and socket joint with a pivot point located at the center of said pivot ring to enable said telescope to be adjusted with respect to said carrier lens about a given cone of rotation with a first cone of rotation at the ocular input of the telescope, about said pivot point, and a second cone of rotation at the other end of the telescope, about said pivot point and means coupled to said collet member for locking said ball and socket joint when said telescope is adjusted to a desired position.

2. The apparatus according to claim 1 wherein said means for locking includes a locking ring having a threaded inner surface for engaging said outer surface portion of said collet member to compress said slots when said ring is moved on said threads towards said opened top.

3. The apparatus according to claim 1 wherein said slots are four in number spaced 90 degrees apart in said collet member.

4. The apparatus according to claim 1 wherein said collet member has a peripheral flange surrounding said opened top and with said flange abutting against said carrier lens and means coupling said flange to said carrier lens.

5. The apparatus according to claim 2 wherein said means is an adhesive.

6. The apparatus according to claim 1 wherein said collet member is fabricated from a plastic.

7. The apparatus according to claim 5 wherein said telescope is a Galilean telescope.

8. The apparatus according to claim 1 wherein said collet member has a tapered bottom end portion.

* * * * *